United States Patent
Steinke et al.

(10) Patent No.: US 8,937,106 B2
(45) Date of Patent: Jan. 20, 2015

(54) MELAMINE RESIN FOAMS WITH NANOPOROUS FILLERS

(75) Inventors: Tobias Heinz Steinke, Speyer (DE); Tatiana Ulanova, Ludwigshafen (DE); Klaus Hahn, Kirchheim (DE)

(73) Assignee: BASF SE, Ludwigshafen (DE)

( * ) Notice: Subject to any disclaimer, the term of this patent is extended or adjusted under 35 U.S.C. 154(b) by 328 days.

(21) Appl. No.: 13/312,717

(22) Filed: Dec. 6, 2011

(65) Prior Publication Data

US 2012/0142802 A1 Jun. 7, 2012

Related U.S. Application Data

(60) Provisional application No. 61/420,340, filed on Dec. 7, 2010, provisional application No. 61/526,274, filed on Aug. 23, 2011.

(51) Int. Cl.
*C08G 12/32* (2006.01)
*C08J 9/00* (2006.01)

(52) U.S. Cl.
CPC ............... *C08G 12/32* (2013.01); *C08J 9/0066* (2013.01); *C08J 2361/28* (2013.01)
USPC ........................................... 521/91; 521/187

(58) Field of Classification Search
CPC .. C08J 9/008; C08J 2205/026; C08J 2361/20; C08J 2361/28
USPC .................................................. 521/91, 187
See application file for complete search history.

(56) References Cited

U.S. PATENT DOCUMENTS

| | | | |
|---|---|---|---|
| 2,093,454 A | 9/1937 | Kistler | |
| 3,615,972 A | 10/1971 | Morehouse, Jr. et al. | |
| 3,872,217 A | 3/1975 | Merz et al. | |
| 3,878,133 A | 4/1975 | Rubens | |
| 3,977,993 A | 8/1976 | Lynch | |
| 4,334,971 A | 6/1982 | Mahnke et al. | |
| 4,511,678 A | 4/1985 | Mahnke et al. | |
| 4,540,717 A | 9/1985 | Mahnke et al. | |
| 4,667,417 A | 5/1987 | Graser et al. | |
| 4,873,218 A | 10/1989 | Pekala | |
| 5,081,163 A * | 1/1992 | Pekala | 521/187 |
| 5,086,085 A | 2/1992 | Pekala | |
| 5,272,001 A | 12/1993 | Weisman | |
| 5,378,733 A | 1/1995 | Bates et al. | |
| 5,418,257 A | 5/1995 | Weisman | |
| 5,738,801 A | 4/1998 | Ziegler et al. | |
| 6,022,912 A | 2/2000 | Spitler et al. | |
| 6,166,109 A | 12/2000 | Spitler et al. | |
| 6,200,681 B1 | 3/2001 | Jahns et al. | |
| 6,608,118 B2 | 8/2003 | Kosaka et al. | |
| 7,166,355 B2 | 1/2007 | Jahns et al. | |
| 2001/0041753 A1 | 11/2001 | Thom | |
| 2005/0136238 A1 | 6/2005 | Lindsay et al. | |
| 2006/0052474 A1 | 3/2006 | Czerny | |
| 2007/0157405 A1 | 7/2007 | Bogaerts et al. | |
| 2007/0213417 A1 | 9/2007 | Stork et al. | |
| 2007/0259979 A1 | 11/2007 | Lee | |
| 2008/0033075 A1 | 2/2008 | Schmidt et al. | |
| 2008/0038302 A1* | 2/2008 | Tanaka | 424/401 |
| 2008/0280126 A1 | 11/2008 | Lenz et al. | |
| 2008/0287561 A1 | 11/2008 | Menashi et al. | |
| 2008/0300329 A1 | 12/2008 | Fechtenkotter et al. | |
| 2009/0029147 A1 | 1/2009 | Tang et al. | |
| 2010/0028655 A1 | 2/2010 | Lenz et al. | |
| 2010/0068525 A1 | 3/2010 | Jung et al. | |
| 2010/0323892 A1 | 12/2010 | Levy et al. | |
| 2010/0327216 A1 | 12/2010 | Jung et al. | |
| 2011/0008608 A1 | 1/2011 | Bellin et al. | |
| 2011/0015072 A1 | 1/2011 | Hechavarria Fonseca et al. | |
| 2011/0034571 A1 | 2/2011 | Hahn et al. | |
| 2011/0124754 A1 | 5/2011 | Alteheld et al. | |
| 2011/0189464 A1 | 8/2011 | Steinke | |
| 2011/0237699 A1 | 9/2011 | Steinke et al. | |
| 2011/0269864 A1 | 11/2011 | Steinke | |
| 2011/0270807 A1 | 11/2011 | Gomez Maturana et al. | |
| 2012/0071578 A1 | 3/2012 | Baumgartl et al. | |
| 2012/0112116 A1 | 5/2012 | Steinke et al. | |
| 2012/0142802 A1 | 6/2012 | Steinke et al. | |
| 2012/0225965 A1 | 9/2012 | Steinke et al. | |

FOREIGN PATENT DOCUMENTS

| | | | |
|---|---|---|---|
| CA | 1151350 A1 | 8/1983 | |
| CA | 1166798 A1 | 5/1984 | |
| CA | 2231428 A1 | 3/1997 | |
| DE | 2103243 A1 | 8/1972 | |
| DE | 2401565 A1 | 7/1975 | |
| DE | 19533564 A1 | 3/1997 | |
| DE | 19649796 A1 | 6/1998 | |
| DE | 10027770 A1 | 12/2001 | |
| DE | 10139171 A1 | 2/2003 | |
| DE | 10 2007 009127 A1 | 9/2007 | |
| DE | 102007055813 A1 | 6/2008 | |

(Continued)

OTHER PUBLICATIONS

U.S. Appl. No. 61/319,900.

(Continued)

*Primary Examiner* — Irina S Zemel
(74) *Attorney, Agent, or Firm* — Drinker Biddle & Reath LLP

(57) ABSTRACT

The invention relates to open-cell melamine resin foams filled with nanoporous particles, especially aerogels or aerosils, and production and use of said foams.

15 Claims, No Drawings

(56) References Cited

FOREIGN PATENT DOCUMENTS

| | | |
|---|---|---|
| EP | 17671 A1 | 10/1980 |
| EP | 17672 A1 | 10/1980 |
| EP | 0031513 A2 | 7/1981 |
| EP | 0037470 A1 | 10/1981 |
| EP | 0049768 A1 | 4/1982 |
| EP | 111 860 A2 | 6/1984 |
| EP | 0171722 A2 | 2/1986 |
| EP | 0 451 535 A1 | 10/1991 |
| EP | 0451535 A1 | 10/1991 |
| EP | 1029018 A1 | 8/2000 |
| EP | 1146070 A2 | 10/2001 |
| EP | 06117092.4 | 7/2006 |
| EP | 1 808 454 A2 | 7/2007 |
| EP | 2 158 243 B1 | 3/2010 |
| EP | 2287241 A1 | 2/2011 |
| GB | 1451132 A | 7/1975 |
| JP | 53025295 A | 3/1978 |
| WO | WO-95 06617 A1 | 3/1995 |
| WO | WO-9710188 A1 | 3/1997 |
| WO | WO-98/52997 A1 | 11/1998 |
| WO | WO-01/94436 | 12/2001 |
| WO | WO-2004022298 A1 | 3/2004 |
| WO | WO-2005/103107 A1 | 11/2005 |
| WO | WO-2005/116559 A1 | 12/2005 |
| WO | WO-2006/008054 A1 | 1/2006 |
| WO | WO-2007/031944 A2 | 3/2007 |
| WO | WO-2007023118 A2 | 3/2007 |
| WO | WO-2008037600 A1 | 4/2008 |
| WO | WO-2008/071649 A2 | 6/2008 |
| WO | WO 2008/138977 | 11/2008 |
| WO | WO-2009/021963 A1 | 2/2009 |
| WO | WO 2010/145993 | 12/2010 |
| WO | WO 2011/004006 | 1/2011 |
| WO | WO-2011/051170 A1 | 5/2011 |

OTHER PUBLICATIONS

U.S. Appl. No. 61/313,134.
U.S. Appl. No. 61/420,343.
U.S. Appl. No. 13/286,370, filed Nov. 1, 2011, Tobias Heinz Steinke, Speyer.
U.S. Appl. No. 13/016,420, filed Jan. 28, 2011, Vo, Hai.
U.S. Appl. No. 13/097,371, filed Apr. 29, 2011, Steinke, Tobias Heinz.
U.S. Appl. No. 13/016,420.
U.S. Appl. No. 13/510,487.
International Preliminary Report on Patentability from corresponding International Application No. PCT/EP2010/067556, dated Jun. 25, 2012.
International Search Report for PCT/EP2010/067556 mailed Feb. 8, 2011.
International Preliminary Report on Patentability for PCT/EP2010/067556 mailed Jan. 16, 2012.
International Search Report, PCT/EP2011/071840, filed Dec. 6, 2011, Mar. 29, 2012.

* cited by examiner

MELAMINE RESIN FOAMS WITH NANOPOROUS FILLERS

CROSS-REFERENCE TO RELATED APPLICATION

This application claims the benefit of U.S. Provisional Application Ser. No. 61/420,340 filed Dec. 7, 2010, and U.S. Provisional Application Ser. No. 61/526,274, filed on Aug. 23, 2011, the entire contents of each of which are incorporated herein by reference in their entirety.

FIELD OF THE INVENTION

This invention relates to open-cell melamine resin foams filled with nanoporous particles, especially aerogels or aerosils, and production and use of said foams.

BACKGROUND

Aerogels and aerosils are highly porous solid bodies in that the predominant portion of their volume consists of pores. Aerogels can be based for example on silicate but also on plastics or carbon. The diameter of aerogel pores is in the nanometer range. Owing to their high pore volume, aerogels are particularly useful as insulating materials combining outstanding insulation properties with low density. Aerogels are initially present as particles, and can be subjected with the use of binders to a shaping process to form panels by pressing for example.

Aerogels are also described in the literature as gels with air as dispersion medium. Aerogels are obtainable by drying a suitable gel. The shaping process of the aerogel is concluded during the sol-gel transition. Once the solid gel structure has become developed, the outer form can only be changed by comminution, for example grinding. Aerogel in the context of the present invention also comprehends xerogels and cryogels.

EP-A-1 146 070 A2 and WO-A-2007/23118 disclose the impregnation of melamine-formaldehyde foams with an ammonium salt and with sodium silicate, respectively.

DE-A-10 2007 009127 A1 discloses fiber-reinforced foams based on melamine-formaldehyde resins having a fiber content from 0.5% to 50% by weight. Short or long fibers of glass, carbon or melamine resin are used as fibrous filler.

WO-A-2009/021963 A1 discloses a process for producing an abrasive foam based on a melamine-formaldehyde condensation product and comprising from 0.01% to 50% by weight of inorganic nanoparticles based on the weight of the precondensate.

US-2009/029147 A1 discloses aerogel-foam composite materials having a density of <150 g/L and a thermal conductivity of <50 mW/m*K. The sol-gel process is carried out in the foam. The drying is done in the supercritical state.

DE 19533564 A1 discloses a composite material comprising from 5% to 97% by volume of aerogel particles, at least one binder and at least one fiber material, a process for its production and also its use. The test specimen thus obtained has a very high density (380 g/l) and thermal conductivity (37 mW/mK).

The properties of known materials are no longer in line with increased expectations, especially in respect of thermal conductivity and acoustical absorption.

BRIEF SUMMARY

The problem addressed by this invention was therefore that of providing improved composite materials which can have an improved thermal conductivity and acoustical absorption and a low density at a relatively low binder content. The composite materials should also be obtainable in a simple manner. The invention shall further provide composite materials which additionally have the A2 fire classification of DIN EN 13501-1.

This invention provides a melamine resin foam comprising particles, said particles being nanoporous and more particularly granular. In one preferred embodiment, the particles are inorganic particles. According to the present invention, the particles are comprised in the volume of the foam, preferably in homogeneous distribution. Additionally, the foam may also include a coating comprising the particles.

In a first embodiment, the present invention provides the inventive melamine resin foam comprising particles preferably in a size from 0.1 to 100 µm and more preferably from 1 to 30 µm ($D_{50}$).

In a second embodiment, the present invention provides the inventive melamine resin foam comprising particles preferably in a size from 0.11 to 25 µm and more preferably from 0.15 to 22 µm ($D_{50}$).

This invention further provides in a first embodiment a process for producing a melamine resin foam comprising nanoporous, preferably inorganic, particles, which comprises the melamine resin foam being impregnated with the nanoporous particles and optionally thermocompressed thereafter. The particles preferably have a size which is less than the pore space of the foam. The particles are preferably granular.

The present invention further provides in a second embodiment a process for producing a melamine resin foam comprising nanoporous granular particles, which comprises producing a mixture comprising at least one melamine-formaldehyde precondensate, at least one solvent and at least one nanoporous particle, foaming this mixture and the foam obtained being subsequently dried and optionally thermocompressed.

This invention further provides for the use of a foam of the present invention for thermal or acoustical insulation.

DETAILED DESCRIPTION OF THE PREFERRED EMBODIMENTS

Unless otherwise stated, herein the terms used are defined as follows and the parameters mentioned are measured as follows:

Particle: Particles are corpuscles which either are monolithic, i.e., consist of one piece, or alternatively comprise essentially particles having a diameter smaller than that of the particulate entity, which are optionally bonded together by a suitable binder or joined together by pressing to form larger corpuscles.

Porosity: Ratio of void volume to overall volume, as measured by nitrogen adsorption and desorption (<100 nm) and mercury porosimetry (>100 nm)

Hydrophobic: Hydrophobic substances in the context of the present substances are such substances as have a contact angle of more than 90° with water at room temperature.

Nanoporous: is to be understood as meaning that the pores of the particles have a size in the range from 0.1 to 500 nm, especially <200 nm and more preferably <100 nm ($D_{50}$) and the porosity is especially 50 to 99, more particularly 70 to 99 and more preferably 80 to 99.

Granular: is to be understood as meaning that the corpuscles in a first embodiment have a size which is preferably in the range from 0.1 to 100 µm and preferably in the range from 1 to 30 µm ($D_{50}$) and the ratio of the longest axis to the shortest axis of the particles is preferably in the range from 4:1 to 1:1. In a second embodiment of the present invention, "granular" is to be understood as meaning that the corpuscles are in a size which is preferably in the range from 0.11 to 25 mm and more preferably in the range from 0.15 to 22 mm ($D_{50}$) and the ratio of the longest axis to the shortest axis of the particles is preferably in the range from 4:1 to 1:1.

Aerosil: is to be understood as referring to pyrogenous silica obtainable by hydrolysis of silicon tetrachloride and preferably having a primary particle size of 5-50 nm ($D_{50}$).

$D_{50}$ value: Size than which 50% of the particles are finer and 50% are coarser.

The proportion of nanoporous particles in the melamine resin foam is preferably in the range from 1% to 99% by volume, more preferably in the range from 5% to 95% by volume and even more preferably in the range from 10% to 90% by volume.

The present invention therefore preferably relates to the foam of the present invention wherein the foam comprises from 1% to 99% by volume, preferably from 5% to 95% by volume and more preferably from 10% to 90% by volume of nanoporous particles or mixtures thereof.

The foamable reactive resin is suitably a melamine-formaldehyde resin and more preferably a melamine-formaldehyde resin, processable into an open-cell foam having a density of ≤25 g/l, i.e. 1.6 to 25 g/l, preferably 2 to 15 g/l, more preferably 3 to 13 g/l and more particularly 4 to 12 g/l and/or a pore size between 10 and 1000 μm and preferably between 50 and 300 μm.

Melamine Resin Foam

The present invention relates to the foam according to the invention wherein the foam is a melamine-formaldehyde resin.

Production processes for open-cell resilient melamine-formaldehyde resins and foams thereof are for example known from WO-A-01/94436 and commercially available under the trade name Basotect®.

Accordingly, the foams are preferably obtainable according to the first embodiment by foaming an aqueous solution of a melamine-formaldehyde condensation product wherein the solution comprises an emulsifier, an acidic curative and a blowing agent, preferably a $C_5$ to $C_7$ hydrocarbon. Thereafter, the melamine-formaldehyde condensate is cured at elevated temperature.

Open-cell foams have a foam scaffold consisting essentially of a multiplicity of interconnected, three-dimensionally branched struts.

The density of the open-cell foam is generally in the range from 5 to 100 g/l and preferably in the range from 8 to 20 g/l. The pore size is preferably in the range from 10 to 1000 μm.

The melamine-formaldehyde precondensates used to produce the melamine-formaldehyde foams of the present invention have a molar ratio of formaldehyde to melamine which is generally in the range from 5:1 to 1.3:1 and preferably in the range from 3.5:1 to 1.5:1. This holds equally for both embodiments of the present invention.

Nanoporous Particles

Preferred nanoporous particles are granular. The nanoporous particles in further preferred embodiments are aerogels or aerosils. These can be inorganic, inorganic-organic, or organic.

The present invention accordingly preferably relates to the foam of the present invention wherein the particles are aerogels or aerosils.

The present invention accordingly further preferably relates to the foam of the present invention wherein the particles are inorganic.

The present invention accordingly preferably further relates to the foam of the present invention wherein the particles are organic.

Aerogel

Suitable aerogels for the composite materials of the present invention are more particularly based on oxides, more particularly silicon dioxide and metal oxides, more particularly aluminum, titanium and zirconium oxide, or those based on organic substances, for example melamine-formaldehyde condensates (U.S. Pat. No. 5,086,085), resorcinol-formaldehyde condensates (U.S. Pat. No. 4,873,218) and also aerogels obtainable by polymerization of furfural with phenolic novolak resins. Of particular suitability are compounds which are suitable for sol-gel technology, see for example WO 97/10188 A1, page 7, first paragraph, for example silicon or aluminum compounds. However, they can also be based on mixtures of the abovementioned materials. Preference is given to using aerogels comprising silicon compounds. Particular preference is given to aerogels comprising $SiO_2$ and more particularly $SiO_2$ aerogels, which are optionally organomodified.

In a first embodiment, the nanoporous particles are preferably $SiO_2$ aerogels having the following parameters:

Porosity: 50 to 99%, especially 70 to 99%, more preferably 80 to 99%

Density: from 30 to 300 g/L, preferably ≤150 g/L

Particle diameter: from 0.1 to 100 μm, preferably from 1 to 30 μm ($D_{50}$)

Pore diameter: 0.1 to 500 nm, especially <200 nm, more preferably <100 nm

The present invention preferably relates to the foam of the present invention wherein the particles have a porosity of 50 to 99, especially 70 to 99 and more preferably 80 to 99.

In addition, the thermal conductivity of aerogels decreases with increasing porosity and decreasing density, down to a density in the region of 0.1 g/cm³. The thermal conductivity of granular aerogel should preferably be less than 40 mW/m*K and more preferably less than 25 mW/m*K.

Particularly preferred aerogels are silica aerogels that consist essentially of amorphous silicon dioxide but, depending on their method of making, may further comprise organic compounds.

Silica aerogel particles are obtainable in known manner from waterglass solution via the stages of silica hydrogel, solvent exchange and subsequent supercritical drying. The bead form generally present is the result of a fast-gelling silica sol being sprayed from a specially designed die and the drops gelling in flight. Further details on this are described in DE-A-21 03 243. The exchange of hydrogel water for other liquids that are chemically inert with regard to silicon dioxide is described for example in U.S. Pat. No. 2,093,454, U.S. Pat. No. 3,977,993 and JP-A-53/025 295.

The aerogel particles can be used in monomodal, bimodal or multimodal distribution.

In a preferred embodiment, the aerogel particles have hydrophobic groups on the surface.

The present invention therefore preferably relates to the foam of the present invention wherein the particles are organomodified and more particularly are modified to be hydrophobic.

Suitable groups for durable hydrophobicization are for example trisubstituted silyl groups of general formula —Si(R)$_3$, preferably trialkyl- and/or triarylsilyl groups, where each R is independently a nonreactive organic moiety such as $C_1$-$C_{18}$ alkyl or $C_5$-$C_{14}$ aryl, preferably $C_1$-$C_6$ alkyl or phenyl, more particularly methyl, ethyl, cyclohexyl or phenyl, which moiety may be additionally substituted with functional groups. The use of trimethylsilyl groups is particularly advantageous for durably hydrophobicizing the aerogel. Introducing these groups can be accomplished by gas phase reaction between the aerogel and, for example, an activated trialkylsilane derivative, e.g., a chlorotrialkylsilane or a hexaalkyldisilazane.

An elegant way to introduce hydrophobic groups is described in EP 0 171 722 and WO 95/06617. The water in the hydrogel is displaced by alcohols. Suitable alcohols for the water exchange are $C_1$-$C_5$ alcohols, more particularly $C_3$-$C_5$ alcohols, of which preference is given to those alcohols which cannot be oxidized to aldehydes, i.e., secondary and tertiary alcohols. The alcohols should also have favorable critical data for the drying. Isobutanol, tert-butanol, sec-pentanol and tert-pentanol and above all isopropanol may be mentioned in particular for example. In addition to monohydric alcohols, polyhydric alcohols such as ethylene glycol and glycerol are also suitable (from WO 95/06617, page 3, lines 32 ff.). Nanoporous particles hydrophobicized in this way are preferably used in the second embodiment.

Functionalizing the Nanoporous Particles

The nanoporous particles, more particularly aerogels, can generally be fixed in the foam. Fixing the nanoporous particles in melamine resin foam can be augmented by introduction of reactive groups into the nanostructure or by incorporating small amounts of binders.

Functionalized chemical compounds such as alkoxysilanes, e.g., 3-aminopropyltriethoxysilane or 3-aminopropylmethoxysilane, are useful for chemically functionalizing the nanostructure for example. These reactive groups are bonded to the aerogel in the first step via the silane unit and in the 2nd step the amino group allows chemical attachment to the reactive groups remaining on the surface of the melamine resin foam.

Suitable systems for functionalization are described at very great length in WO 2005103107 A1, page 9, line 18 to page 15, line 4, and are expressly incorporated in this application by reference.

Useful binders include polymeric substances for example melamine-formaldehyde resins. Suitable polyurethane resins, polyester resins or epoxy resins are known to a person skilled in the art. Such resins are found for example in Encyclopedia of Polymer Science and Technology (Wiley) under the following chapters: a) Polyesters, unsaturated: Edition 3, Vol. 11, 2004, p. 41-64; b) Polyurethanes: Edition 3, Vol. 4. 2003, p. 26-72 and c) Epoxy resins: Edition 3, Vol. 9, 2004, p. 678-804. In addition, Ullmann's Encyclopedia of Industrial Chemistry (Wiley) includes the following chapters: a) Polyester resins, unsaturated: Edition 6, Vol. 28, 2003, p. 65-74; b) Polyurethanes: Edition 6, Vol. 28, 2003, p. 667-722 and c) Epoxy resins: Edition 6, Vol. 12, 2003, p. 285-303. It is further possible to use amino- or hydroxyl-functionalized polymers, more particularly a polyvinylamine or polyvinyl alcohol. Examples based on melamine and phenolic resin and also acrylamide are described in EP 0451535B1 and DE 19649796A1.

The nanoporous particles can be impregnated with the adhesive-bonding assistants before the impregnating step or directly in the foam structure.

The amount of binder can be varied within wide limits and is generally in the range from 1% to 20% by weight, preferably in the range from 1% to 10% by weight and more preferably in the range from 1% to 5% by weight, based on the nanoporous particles, advantageously the amount of binder is set to the minimum in order to ensure a corresponding coating.

Additives

The foam may comprise effective amounts of further addition agents such as, for example, dyes, pigments, fillers, flame retardants, synergists for flame retardants, antistats, stabilizers, plasticizers and IR opacifiers.

The present invention therefore preferably provides a foam according to the present invention which further comprises an opacifier.

To reduce the radiative contribution to thermal conductivity, the foam may comprise IR opacifiers such as, for example, metal oxides, nonmetal oxides, metal powders, e.g., aluminum powder, carbon, e.g., carbon black, graphite, diamond or organic dyes and dye pigments, which is advantageous for uses at high temperatures in particular. Particular preference is given to carbon black, titanium dioxide, iron oxides or zirconium dioxide. The aforementioned materials can be used in each case not only singly but also in combination, i.e., in the form of a mixture of two or more materials.

Impregnation

In the first embodiment of the present invention, the melamine resin foam according to the present invention comprising particles preferably in a size of 0.1 to 100 μm preferably of 1 to 30 μm ($D_{50}$) is preferably obtained by impregnating the foam with the corresponding nanoporous particles.

A flexible, open-cell melamine resin foam, preferably Basotect® from BASF SE, is impregnated according to the present invention with nanoporous particles, such as aerogel or aerosil for example, preferably by impregnating the foam with a granular bed of nanoporous particles. The impregnating step is preferably effected in the dry state under reduced pressure. This does away with the need for subsequent dewatering and drying steps.

The nanoporous particles must in this first embodiment preferably by selected so as to be smaller in size than the average pore diameter of the melamine resin foam. The $D_{50}$ value of the particles used is preferably ≤100 μm and more preferably ≤30 μm.

The aerogels can be sucked into the melamine resin foam by applying a reduced pressure. The reduced pressure can be produced in any manner known to a person skilled in the art, for example by means of a vacuum pump. Pressures applied range from 1 to 900 mbar, preferably from 10 to 800 mbar and more preferably from 10 to 500 mbar. To prevent the aerogels escaping from the foam into the pump, a fine filter can be placed between the foam and the pump and replaced as required, for example.

Alternatively, in this first embodiment, the nanoporous particles can also be incorporated in the melamine resin foam by blowing the nanoporous particles into the foam using superatmospheric pressure or by impregnating the foam with an aqueous impregnating solution. The latter method requires the nanoporous particles to be dispersed in a liquid. The liquid must be chosen such that the nanoporous particles are only wetted surficially. The surficial wetting can be improved by dispersants. Useful dispersants and/or emulsifiers include anionic, cationic and nonionic surfactants and also mixtures thereof. The superfluous liquid is subsequently squeezed off and the foam is dried at 120 to 200° C.

To improve the imbibition capacity of the flexible melamine resin foam, the foam can additionally be compressed and decompressed in the course of the impregnating step. The foam can be compressed by any methods known to a person skilled in the art. Useful pressurizing bodies include for example rolls, calenders, double strand belts or rams. The size to which the melamine-formaldehyde resin foam is compressed is generally in the range from 1 to 80%, preferably from 2 to 50% and more preferably from 3 to 30% of its volume.

Applying the mixture to the foam and pressing the foam can be carried out, for example, as described in EP-A 0451 535. For this purpose, the foam is passed between two rolls rotating in the opposite direction, with the gap between the rolls being selected such that foam is compressed in the process. The mixture in which the foam is impregnated is fed onto the rolls which are horizontally next to each other, so that a pool of liquid is formed at the point at which the foam passes between the rolls. As a result of the rotational motion of the rolls and the pressing of the foam, the mixture in the pool of liquid is pressed into the foam.

In a preferred embodiment, the foam is thermocompressed in a second step. Processes describing the subsequent compressing of melamine-formaldehyde foams are known from WO-A-2007/031944, EP-A-451 535, EP-A-111 860 and U.S. Pat. No. 6,608,118. The compressing endows the nanoporous particles with improved fixing in the open-cell structure of the foam and the packing of nanoporous particles is densified, which leads to a reduction in thermal conductivity.

The degree of compression may be optionally in the range from 1 to 90%, preferably in the range from 5 to 80%, more preferably in the range from 10 to 70% and even more preferably in the range from 20 to 60% based on the initial height (height of rise) in foaming. Depending on the degree of compression, in the first embodiment, densities of elastic foams comprising nanoporous particles are in the range from 5 to 150 g/l, preferably in the range from 10 to 100 g/L and more preferably in the range from 20 to 70 g/L.

In a second embodiment, the present invention relates to the inventive melamine resin foam comprising particles wherein the particles are nanoporous and preferably granular and wherein the nanoporous particles preferably have a particle size ($D_{50}$ value) of 0.11 to 25 mm.

In a preferred embodiment, this melamine resin foam, in which the particles are nanoporous and preferably granular, and preferably have a particle size ($D_{50}$ value) of 0.11 to 25 mm, is produced by producing a mixture comprising at least one melamine-formaldehyde precondensate, at least one solvent and at least one nanoporous particle, foaming this mixture and then optionally drying the foam obtained.

For the A2 fire class of DIN EN 13501-1, the melamine-formaldehyde foams of the present invention comprise generally from 80% to 98% by weight, preferably from 80% to 95% by weight, more preferably from 85% to 95% by weight and more preferably from 85% to 90% by weight of the nanoporous particles in accordance with the second embodiment, wherein the % by weight are each based on the total weight of nanoporous particles and melamine-formaldehyde precondensate used for foam production.

The melamine resin foam according to the second embodiment of the present invention therefore preferably meet the A2 fire classification of DIN EN 13501-1.

The foamable reactive resin for this second embodiment is suitably in general the same melamine-formaldehyde resins as already mentioned with regard to the first embodiment of the present invention.

The nanoporous particles in the second embodiment of the present invention preferably have an average diameter in the range from 0.11 to 25 mm and more preferably in the range from 0.15 to 22 mm ($D_{50}$ value, number averaged, determined via optical or electron microscopy combined with image analysis). These particulate filling materials can have a mono-, bi- or multimodal size distribution.

The individual particles of the nanoporous particles can themselves be constructed of smaller agglomerated corpuscles, often referred to as primary particles. For example, the particulate filling materials can be used in the form of agglomerated particles having the above-described corpuscle diameters, wherein each agglomerate consists of smaller primary particles. Such agglomerated particles are known in principle to a person skilled in the art and are described in the literature; they are obtainable for example by adding agglomeration assistants to the primary particles and subsequent mixing.

In the nanoporous particles used according to the present invention, the ratio of the longest axis to the shortest axis of the particles is generally in the range from 4:1 to 1:1, preference being given to spherical filling materials.

The constitution and production of the nanoporous particles which are preferably used in the second embodiment of the present invention are in principle subject to what was said in respect of the nanoporous particles of the first embodiment.

In a second embodiment of the present invention, the nanoporous particles are preferably $SiO_2$ aerogels having the following parameters:

porosity: 50 to 99, especially 70 to 99, more preferably 80 to 99 density: from 30 to 300 g/L, preferably <150 g/L particle diameter: from 0.11 to 25 mm, preferably from 0.15 to 22 mm ($D_{50}$)

pore diameter: 0.1 to 500 nm, especially <200 nm, more preferably <100 nm.

The melamine-formaldehyde foams used according to the present invention comprise an open-cell scaffolding of foamed material, the scaffolding comprising a multiplicity of interconnected, three-dimensionally branched struts, and in each of which the nanoporous particles are embedded into the pore structure. The particle size in the second embodiment of the present invention is preferably not less than the average pore diameter (pore size) of the foam structure, this average pore diameter preferably being in the range from 10 to 1000 μm and more particularly being in the range from 50 to 600 μm ($d_{50}$ value, number averaged, determined via optical or electron microscopy combined with image analysis). The nanoporous particles become bound into the pore structure of the open-cell foam and fixed from all sides of the pore structure. Such a structure according to the second embodiment of the present invention is generally not obtainable by subsequent impregnation of the foam with nanoporous particles, since the process according to the first embodiment preferably requires the corpuscle size of the particles to be chosen such that the corpuscle size is smaller than the pore size of the foam to ensure distribution in the entire foam.

The present invention therefore preferably provides the inventive foam wherein the foam has a pore size in the range from 10 to 1000 μm.

The melamine-formaldehyde precondensates used to produce the melamine-formaldehyde foams of the present invention generally have a molar ratio of formaldehyde to melamine in the range from 5:1 to 1.3:1 and preferably in the range from 3.5:1 to 1.5:1. This holds equally for both the embodiments of the present invention.

These melamine-formaldehyde condensation products, in addition to melamine, may comprise from 0% to 50% by weight, preferably from 0% to 40% by weight, more preferably from 0% to 30% by weight and more particularly from 0% to 20% by weight of other thermoset-formers and, in addition to formaldehyde, from 0% to 50% by weight, preferably from 0% to 40% by weight, more preferably from 0% to 30% by weight and more particularly from 0% to 20% by weight of other aldehydes, in cocondensed form. Preference is given to unmodified melamine-formaldehyde precondensates.

Useful thermoset-formers include for example alkyl- and aryl-substituted melamine, urea, urethanes, carboxamides, dicyandiamide, guanidine, sulfurylamide, sulfonamides, aliphatic amines, glycols, phenol or their derivatives.

Useful aldehydes include for example acetaldehyde, trimethylolacetaldehyde, acrolein, benzaldehyde, furfural, glyoxal, glutaraldehyde, phthalaldehyde, terephthalaldehyde or their mixtures. Further details concerning melamine-formaldehyde condensation products are found in Houben-Weyl, Methoden der organischen Chemie, volume 14/2, 1963, pages 319 to 402.

The melamine-formaldehyde foams of the second embodiment of the invention are preferably obtainable as follows:

The particulate filling materials can be added to the feedstocks used for foam production, i.e., the melamine, the formaldehyde, their mixtures or a melamine-formaldehyde precondensate, during the foaming operation, but are preferably added before the foaming operation.

The present invention accordingly provides, in a second embodiment, a process for producing a melamine resin foam comprising nanoporous granular particles, which comprises producing a mixture comprising at least one melamine-formaldehyde precondensate, at least one solvent and at least one nanoporous particle, foaming this mixture and the foam obtained being subsequently dried and optionally thermocompressed. Preferably, this process is used to produce the melamine resin foams of the present invention which are in accordance with the second embodiment.

A melamine-formaldehyde precondensate and a solvent can preferably be foamed with an acid, a dispersant, a blowing agent and particulate filling material at temperatures above the boiling temperature of the blowing agent, and subsequently dried.

In one particular embodiment, the nanoporous particles are coated with binders by methods known to a person skilled in the art before being added to the foaming operation. This can be accomplished for example by means of a spraying apparatus in a mixing apparatus (for example an intensive mixer from Elrich). Homogeneous wetting of the filling materials is achieved in this way. In one particular embodiment, the coating material is not allowed to fully harden in order that attachment in the foam may be increased.

As melamine-formaldehyde precondensates there may be used specially prepared precondensates of the two components, melamine and formaldehyde (see reviews: a) W. Woebcken, Kunststoffhandbuch 10. Duroplaste, Munich, Vienna 1988, b) Encyclopedia of Polymer Science and Technology, $3^{rd}$ edition, Vol. 1, Amino Resins, pages 340 to 370, 2003 c) Ullmann's Encyclopedia of Industrial Chemistry, 6th edition, Vol. 2, Amino Resins, pages 537 to 565. Weinheim 2003) or commercially available precondensates of the two components, melamine and formaldehyde. The melamine-formaldehyde precondensates generally have a molar ratio of formaldehyde to melamine in the range from 5:1 to 1.3:1 and preferably in the range from 3.5:1 to 1.5:1, A preferred version of the process for producing the foam of the present invention comprises the stages of (1) producing a suspension comprising a melamine-formaldehyde precondensate of the foam to be produced, at least one solvent and at least one nanoporous particle, and optionally further added components, (2) foaming the precondensate by heating the suspension from step (1) to a temperature above the boiling temperature of the blowing agent, (3) drying the foam obtained from step (2).

The individual process steps and the various possible versions will now be more particularly discussed.

The melamine-formaldehyde precondensate may be prepared in the presence of alcohols, for example methanol, ethanol or butanol in order that partially or fully etherified condensates may be obtained. Forming the ether groups is a way of influencing the solubility of the melamine-formaldehyde precondensate and the mechanical properties of the fully cured material.

Step (1) may also utilize dispersants or an emulsifier, for example anionic, cationic and nonionic surfactants and mixtures thereof.

Useful anionic surfactants include for example diphenylene oxide sulfonates, alkane- and alkylbenzenesulfonates, alkylnaphthalenesulfonates, olefinsulfonates, alkyl ether sulfonates, fatty alcohol sulfates, ether sulfates, $\alpha$-sulfo fatty acid esters, acylaminoalkanesulfonates, acyl isethionates, alkyl ether carboxylates, N-acylsarcosinates, alkyl and alkylether phosphates. Useful nonionic surfactants include alkylphenol polyglycol ethers, fatty alcohol polyglycol ethers, fatty acid polyglycol ethers, fatty acid alkanolamides, ethylene oxide-propylene oxide block copolymers, amine oxides, glycerol fatty acid esters, sorbitan esters and alkylpolyglycosides. Useful cationic emulsifiers include for example alkyltriammonium salts, alkylbenzyldimethylammonium salts and alkylpyridinium salts.

The dispersants/emulsifiers can be added in amounts from 0.2% to 5% by weight, based on the melamine-formaldehyde precondensate.

The dispersants/emulsifiers and/or protective colloids can in principle be added to the crude dispersion at any time, but they can also already be present in the solvent at the time the microcapsule dispersion is introduced.

In principle, the process of the present invention according to the second embodiment can use both physical and chemical blowing agents.

Depending on the choice of melamine-formaldehyde precondensate, the mixture comprises a blowing agent. The amount of blowing agent in the mixture generally depends on the desired density for the foam.

"Physical" or "chemical" blowing agents are suitable (Encyclopedia of Polymer Science and Technology, Vol, I, $3^{rd}$ ed., Additives, pages 203 to 218, 2003).

Useful "physical" blowing agents include for example hydrocarbons, such as pentane, hexane, halogenated, more particularly chlorinated and/or fluorinated, hydrocarbons, for example methylene chloride, chloroform, trichloroethane, chlorofluorocarbons, hydrochlorofluorocarbons (HCFCs), alcohols, for example methanol, ethanol, n-propanol or isopropanol, ethers, ketones and esters, for example methyl formate, ethyl formate, methyl acetate or ethyl acetate, in liquid form or air, nitrogen or carbon dioxide as gases.

Useful "chemical" blowing agents include for example isocyanates mixed with water, releasing carbon dioxide as active blowing agent. It is further possible to use carbonates and bicarbonates mixed with acids, in which case carbon dioxide is again produced. Also suitable are azo compounds, for example azodicarbonamide.

In a preferred embodiment of the invention, the mixture further comprises at least one blowing agent. This blowing agent is present in the mixture in an amount of 0.5% to 60% by weight, preferably 1% to 40% by weight and more preferably 1.5% to 30% by weight, based on the melamine-formaldehyde precondensate. It is preferable to add a physical blowing agent having a boiling point between 0 and 80° C.

As curatives it is possible to use acidic compounds which catalyze the further condensation of the melamine resin. The amount of these curatives is generally in the range from 0.01% to 20% by weight and preferably in the range from 0.05% to 5% by weight, all based on the precondensate. Useful acidic compounds include organic and inorganic acids, for example selected from the group consisting of hydrochloric acid, sulfuric acid, phosphoric acid, nitric acid, formic acid, acetic acid, oxalic acid, toluenesulfonic acids, amidosulfonic acids, acid anhydrides and mixtures thereof.

In a further embodiment, the mixture, in addition to the melamine-formaldehyde precondensate of the foam to be produced and the nanoporous particles, also comprises an emulsifier and optionally a curative.

In a further embodiment, the mixture is free of further added substances.

However, for some purposes it can be advantageous to add from 0.1% to 20% by weight, preferably from 0.1% to 10% by weight, based on the melamine-formaldehyde precondensate, of customary added substances other than the nanoporous particles, such as fibers, dyes, flame retardants, UV stabilizers, agents for reducing the toxicity of fire gases or for promoting carbonization, scents, optical brighteners or pigments. These added substances preferably form a homogeneous distribution in the foamed material.

Useful pigments include for example the common organic pigments. These pigments can be mixed with the nanonporous particles beforehand.

The next step of the process according to the present invention comprises the precondensate being foamed up generally by heating the suspension of the melamine-formaldehyde precondensate and of the nanoporous particles to obtain a foamed material comprising the nanoporous particles. To this end, the suspension is generally heated to a temperature above the boiling point of the blowing agent used and foamed in a closed mold.

The introduction of energy may preferably be effected via electromagnetic radiation, for example via high-frequency radiation at 5 to 400 kW, preferably 5 to 200 kW and more preferably 9 to 120 kW per kilogram of the mixture used in a frequency range from 0.2 to 100 GHz, preferably 0.5 to 10 GHz. Magnetrons are a useful source of dielectric radiation, and one magnetron can be used or two or more magnetrons at the same time.

The foamed materials produced are finally dried, removing residual water and blowing agent from the foam.

An aftertreatment can also be utilized to hydrophobicize the foam. This aftertreatment preferably employs hydrophobic coating agents having high thermal stability and low flammability, for example silicones, siliconates or fluorinated compounds.

The process described provides blocks/slabs of foamed material, which can be cut to size in any desired shapes.

The foam blocks or slabs can optionally be thermocompressed in a further process step. Thermocompression as such is known to a person skilled in the art and described for example in WO 2007/031944, EP-A 451 535, EP-A 111 860 and U.S. Pat. No. 6,608,118. Thermocompression often provides better fixing of the particulate filling materials to the open-cell structure of foam.

The density of the foam is, according to the second embodiment, generally in the range from 5 to 300 kg/m$^3$, preferably in the range from 10 to 200 kg/m$^3$, more preferably in the range from 30 to 150 kg/m$^3$ and more preferably in the range from 50 to 150 kg/m$^3$.

The foam obtainable by the process of the present invention preferably has an open-cell structure having an open-cell content, when measured to DIN ISO 4590, of more than 50% and more particularly more than 80%.

The average pore diameter is preferably in the range from 10 to 1000 μm and more particularly in the range from 50 to 600 μm.

Processing

When the material is produced in the form of sheet bodies, for example plates or mats, by a process according to the first or second embodiment of the present invention, it may have been laminated on at least one side with at least one covering layer in order that the properties of the surface may be improved, for example to increase the robustness, turn it into a vapor barrier or guard it against easy soiling. The covering layers can also improve the mechanical stability of the composite molding. When covering layers are used on both faces, these covering layers can be identical or different.

Useful covering layers include any materials known to a person skilled in the art. They can be aporous and hence act as vapor barrier, for example polymeric foils, preferably metal foils or metalized polymeric foils that reflect thermal radiation. But it is also possible to use porous covering layers which allow air to penetrate into the material and hence lead to superior acoustical insulation, examples being porous foils, papers, wovens or nonwovens.

Lamination may further be effected for example, with substantial retention of the acoustical properties, with so-called "open" systems, for example perforated plates.

The covering layers may themselves also consist of two or more layers. The covering layers can be secured with the binder with which the fibers and the aerogel particles are bonded to and between each other, but it is also possible to use some other adhesive.

The surface of the composite material can be closed and consolidated by incorporating at least one suitable material into a surface layer. Useful materials include, for example, thermoplastic polymers, e.g., polyethylene and polypropylene, or resins such as melamine-formaldehyde resins for example.

The composite materials of the present invention have thermal conductivities between 10 and 100 mW/mK, preferably in the range from 10 to 50 mW/mK and more preferably in the range from 15 to 40 mW/mK.

Use

The present invention also provides for the use of a foam of the present invention for thermal or acoustical insulation, especially in building construction, in automotive, ship or track vehicle building, in the building of spacecraft or in the furniture industry.

The melamine resin foams of the present invention find application in the cushioning of sitting and lying areas, and also for arm and backrests, as heat, cold and/or sound protection or insulation/encapsulation of buildings and parts of buildings, more particularly walls, partitions, roofs, exteriors, doors, ceilings and floors, of vehicles of any kind on land, on water, in the air and in space, whether for transporting cargo or people, or any such combination in passenger cars, trucks, for example for encapsulating the engine space (such as engine cowlings) or passenger cells, in rail traffic in rail cars in goods or people transportation and also in locomotives, in aircraft, for example in the cabin interior, the cockpit or in the cargo space, and also in aerospace in manned or unmanned flying objects such as spaceships and space gliders, space capsules or satellites, for low-temperature insulation, for example of cooling assemblies, refrigerators, cold-storage depots, tank farms and containers for any desired liquids, more particularly for oil and gas or liquefied gas, for storage and in transportation, and also in the textile sector (apparel).

Fields of application are preferably in sectors that require high thermal stability and low flammability, for example in porous burners. The melamine resin foams of the present invention can further be used as a cleaning sponge to remove persistent soiling.

EXAMPLES

Example 1

Producing a Modified Melamine-Formaldehyde Foam

A Basotect® foam 255 mm in diameter and 40 nm in thickness was placed in a Buchner funnel having a diameter of 25 cm. The funnel was fitted to a suction flask which was connected to a rotary vane oil pump. A reduced pressure of 200 mbar was applied to suck $SiO_2$-based aerogel into the foam. A loading of 62% by volume was achieved.

The inorganic aerogel based on $SiO_2$ is characterized by the following properties:
thermal conductivity: 18 mW/mK
porosity: >90
pore diameter: 10-30 nm
density: 30-50 kg/m$^3$
particle diameter: 7-11 μm ($D_{50}$)
surface property: hydrophobic
opacity: translucent From the modified foam E of the present invention and an unmodified Basotect® foam (foam specimen A), a rectangular plate having the dimensions 170×170×40 mm was in each case compressed to half its initial volume in an electrically heated and temperature-controlled hydraulic platen press in the direction of the shortest spatial coordinate at 200° C. and 4 bar for 3 min.

A device (Lambda-Control, from Hesto) was used to determine the thermal conductivity between 10 and 36° C. (midvalue 23° C.).

The results are compiled in table 1.

| Foam specimen | Density [g/l] | Aerogel [vol %] | Thermal conductivity [mW/m * K] |
|---|---|---|---|
| E | 45.0 | 62 | 25.1 |
| A | 19.6 | — | 31.3 |

Example 2

The foams E and A obtained as per example 1 were subjected to a measurement of the absorption coefficient according to ISO 10 534-2, see table 2:

| Frequency | Absorption coefficient, 20 mm plate thickness | |
|---|---|---|
| [Hz] | E | A |
| 100 | 0.053 | 0.063 |
| 125 | 0.059 | 0.054 |
| 160 | 0.073 | 0.056 |
| 200 | 0.083 | 0.06 |
| 250 | 0.113 | 0.075 |
| 315 | 0.147 | 0.084 |
| 400 | 0.249 | 0.099 |
| 500 | 0.453 | 0.14 |
| 630 | 0.829 | 0.203 |

| Frequency | Absorption coefficient, 20 mm plate thickness | |
|---|---|---|
| [Hz] | E | A |
| 800 | 0.886 | 0.273 |
| 1000 | 0.718 | 0.349 |
| 1250 | 0.851 | 0.455 |
| 1600 | 0.898 | 0.586 |
| 2000 | 0.806 | 0.706 |
| 2500 | 0.685 | 0.816 |
| 3150 | 0.597 | 0.908 |
| 4000 | 0.615 | 0.951 |
| 5000 | 0.727 | 0.947 |

The inventive material E exhibits a distinctly improved, lower thermal conductivity and a distinctly improved acoustical absorption in the middle frequencies.

Comparative Example 3

Producing a Melamine-Formaldehyde Foam without Filling Materials (According to WO-A-2009/021963)

75 parts by weight of a spray-dried melamine-formaldehyde precondensate (molar ratio 1:3) were dissolved in 25 parts by weight of water, then 3% by weight of formic acid, 2% by weight of a sodium $C_{12}/C_{14}$-alkyl sulfate, 20% by weight of pentane, all based on the precondensate, were added, this was followed by stirring and then foaming in a polypropylene mold (for foaming) by irradiation with microwave energy. After foaming, the foam was dried for 30 minutes.

The melamine-formaldehyde foam has a density of 10 g/l. The thermal conductivity is 34.2 mW/m*K.

Example 4

An inorganic aerogel based on $SiO_2$ was prepared as described in WO 95/06617. The inorganic aerogel is characterized by the following properties:
thermal conductivity: 35 mW/mK of bed
bulk density: 120 kg/m$^3$
particle diameter: 1-20 mm ($D_{50}$)
opacity: translucent The aerogel was sieved and the 8-20 mm corpuscle sizes were used for the subsequent foaming tests. The thermal conductivity of this sieved fraction was 35 mW/m*K.

Example 5

Producing a melamine-formaldehyde foam with 93% by weight of inorganic aerogel as per example 4 (based on total weight of particulate filling material plus melamine-formaldehyde precondensate used for foam production) as filling material.

75 parts by weight of a spray-dried melamine-formaldehyde precondensate (molar ratio 1:3) were dissolved in 25 parts by weight of water, 3% by weight of formic acid, 2% by weight of a sodium $C_{12}/C_{14}$ alkyl sulfate, 20% by weight of pentane, the % by weight each being based on the precondensate, and 1015 parts by weight of inorganic aerogel (grain size: 8 to 18 mm, average corpuscle diameter 10.4 mm ($d_{50}$ value, number averaged, determined via optical or electron microscopy combined with image analysis)) were added, which was followed by stirring and then foaming in a polypropylene mold (for foaming) by irradiation with microwave energy. The amount of aerogel was chosen such that the foaming mold is completely filled with a bed of aerogels. After foaming, the foam was dried for 30 minutes.

The foam has a density of 137 g/l and a thermal conductivity of 22.6 mW/m*K. The foam fulfilled the fire class A2 requirements of DIN EN 13501-1.

Standards and methods of measurement used:

This European standard DIN EN 13501-1, Fire classification of construction products and building elements, mandates the methods of classifying the fire behavior of construction products including the products within building elements. A construction product intended for class A2 has to be tested either to EN ISO 1182 or EN ISO 1716. Additionally, all construction products intended for class A2 have to be tested to EN 13823.

Thermal conductivity was determined using a device (Lambda-Control, from Hesto) between 10 and 36° C. (mean value 23° C.).

We claim:

1. A melamine resin foam comprising particles, said particles being nanoporous, wherein said melamine resin foam has a pore size in the range from 10 to 1000 μm, and wherein the nanoporous particles have a particle size ($D_{50}$ value) in the range from 0.1 to 100 μm and a porosity of 50 to 99%.

2. The foam according to claim 1 which is a melamine-formaldehyde resin.

3. The foam according to claim 1 which is a melamine-formaldehyde resin having a melamine-to-formaldehyde molar ratio in the range from 1:1.2 to 1:4.

4. The foam according to claim 1 comprising from 1% to 99% by volume of nanoporous particles or mixtures thereof.

5. The foam according to claim 1 wherein the particles are aerogels or aerosils.

6. The foam according to claim wherein the particles are inorganic.

7. The foam according to claim 1 wherein the particles are organic.

8. The foam according to claim 1 wherein the particles are organomodified.

9. The foam according to claim 1 wherein the nanoporous particles are $SiO_2$ aerogels having the following parameters:
density: from 30 to 300 g/L
particle diameter: from 0.1 to 100 μm
pore diameter: 0.1 to 500 nm.

10. The foam according to claim 1 further comprising an opacifier.

11. A process for producing the melamine resin foam according to claim 1, said process comprising impregnating the melamine resin foam being impregnated with the particles and optionally thermocompressing the impregnated melamine resin foam thereafter.

12. A process for producing the melamine resin foam according to claim 1, which comprises producing a mixture comprising at least one melamine-formaldehyde precondensate, at least one solvent, at least one blowing agent, and at least one nanoporous particle, foaming this mixture and the foam obtained being subsequently dried and optionally thermocompressed.

13. A melamine resin foam comprising particles, said particles being nanoporous, wherein said melamine resin foam has a pore size in the range from 10 to 1000 μm, and wherein the nanoporous particles have a particle size ($D_{50}$ value) in the range from 0.11 to 25 mm and a porosity of 50 to 99%.

14. The foam according to claim 13 wherein the nanoporous particles are $SiO_2$ aerogels having the following parameters:
density: from 30 to 300 g/L
particle diameter: from 0.11 to 25 mm
pore diameter: 0.1 to 500 nm.

15. The foam according to claim 13 wherein the nanoporous particles are $SiO_2$ aerogels having the following parameters:
porosity: 80 to 99
density: from 30 to <150 g/L
particle diameter: 0.15 to 22 mm ($D_{50}$)
pore diameter: 0.1 to <100 nm.

* * * * *